United States Patent
Sorenson

[19]

[11] Patent Number: 6,039,455
[45] Date of Patent: Mar. 21, 2000

[54] INFANT OBSERVATION MIRROR ATTACHABLE TO AN INFANT CAR SEAT

[76] Inventor: Karen Sorenson, RR 4, Site 19, Box 35, Edmonton Alberta, Canada, T5E 5S7

[21] Appl. No.: 09/309,635

[22] Filed: May 12, 1999

[51] Int. Cl.[7] .............................. F21V 33/00; G02B 5/08; G02B 7/182
[52] U.S. Cl. .......................... 362/142; 362/144; 362/135; 362/488; 359/838; 359/857; 359/872; 359/881; 248/479; 248/487
[58] Field of Search ..................................... 359/838, 857, 359/872, 876, 881, 862, 865; 362/488, 494, 135, 136, 140, 142, 143, 144; 248/476, 479, 485, 487

[56] References Cited

U.S. PATENT DOCUMENTS

| | | | |
|---|---|---|---|
| 1,845,401 | 2/1932 | Dietrich | .................................... 362/488 |
| 4,359,266 | 11/1982 | Rohlf et al. . | |
| 4,702,572 | 10/1987 | Cossey . | |
| 4,703,972 | 11/1987 | Omberg . | |
| 4,902,118 | 2/1990 | Harris | ....................................... 350/631 |
| 4,909,618 | 3/1990 | Gardner | .................................. 350/623 |
| 5,106,177 | 4/1992 | Dolasia | .................................... 359/872 |
| 5,165,081 | 11/1992 | Drumheller . | |
| 5,285,321 | 2/1994 | Nolan-Brown . | |
| 5,453,882 | 9/1995 | Westman | .................................. 359/872 |
| 5,453,915 | 9/1995 | Bradley, III | .............................. 362/135 |
| 5,576,898 | 11/1996 | Rubin | ....................................... 359/872 |
| 5,668,526 | 9/1997 | Collins . | |

*Primary Examiner*—Ricky D. Shafer
*Attorney, Agent, or Firm*—David S. Thompson

[57] ABSTRACT

An infant observation mirror 10 is attachable to a rear-facing infant car seat 200. A fastening assembly 20 includes a C-clamp which attaches to the upper edge of the back of the car seat. Alternative versions of the fastening assembly include a modified alligator clamp and a resilient spring clamp. A first end of a curved arm assembly 50 extends from the fastening assembly over the car seat. A preferred curved arm assembly provides a resilient skeleton the shape of which may be adjusted and a soft protective covering. A mirror assembly 60 is supported by the second end of the curved arm assembly, and typically provides a light-weight mylar plastic mirror. An adjustment assembly 70 allows rotation of the mirror about a horizontal and a vertical axis. A lighting assembly 90 provides soft lighting to illuminate the child during night driving. An auxiliary rearview mirror assembly 300 attaches to the support carrying the car's rearview mirror, thereby allowing the driver to view the mirror assembly 60 without moving the car's rearview mirror.

9 Claims, 5 Drawing Sheets

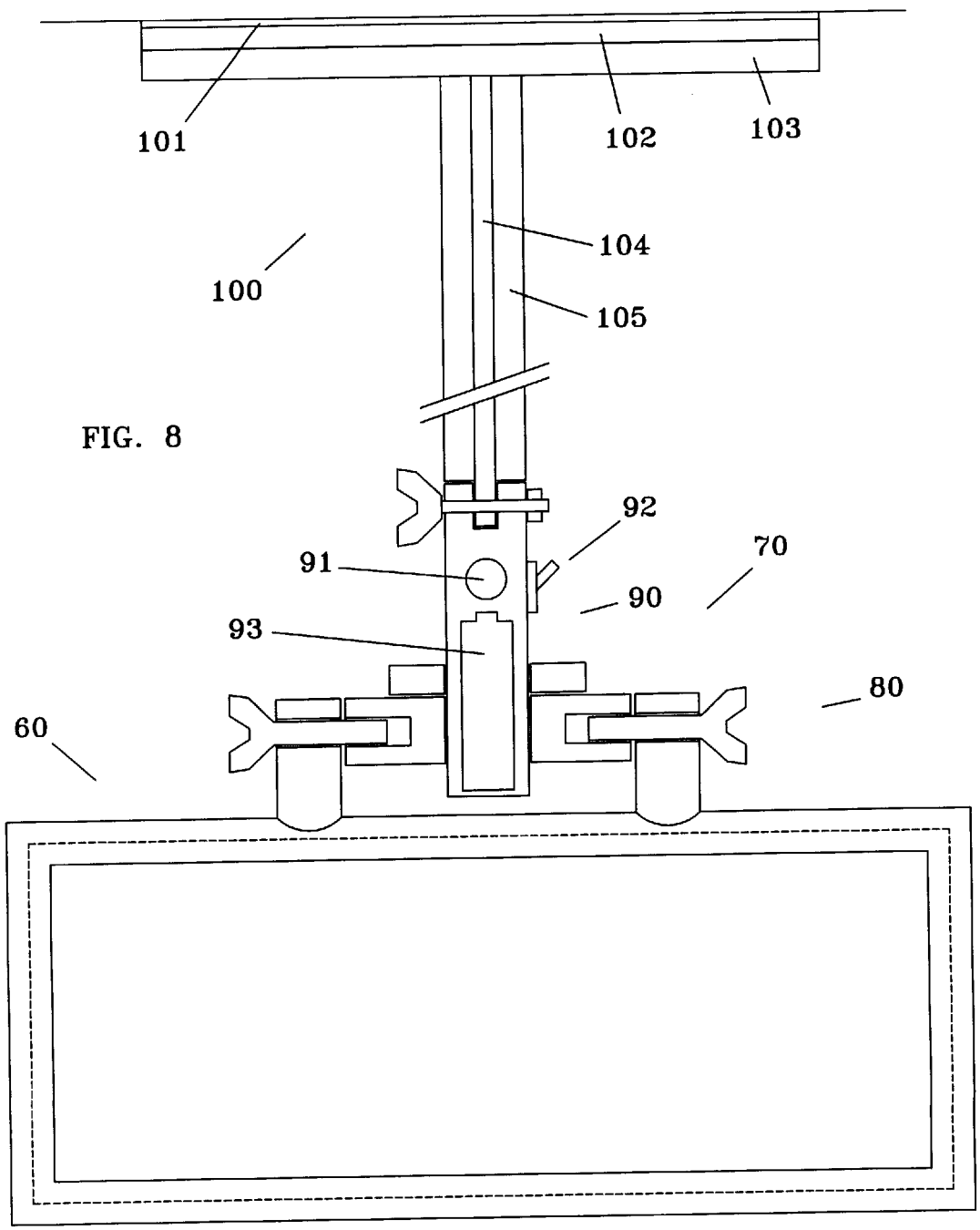

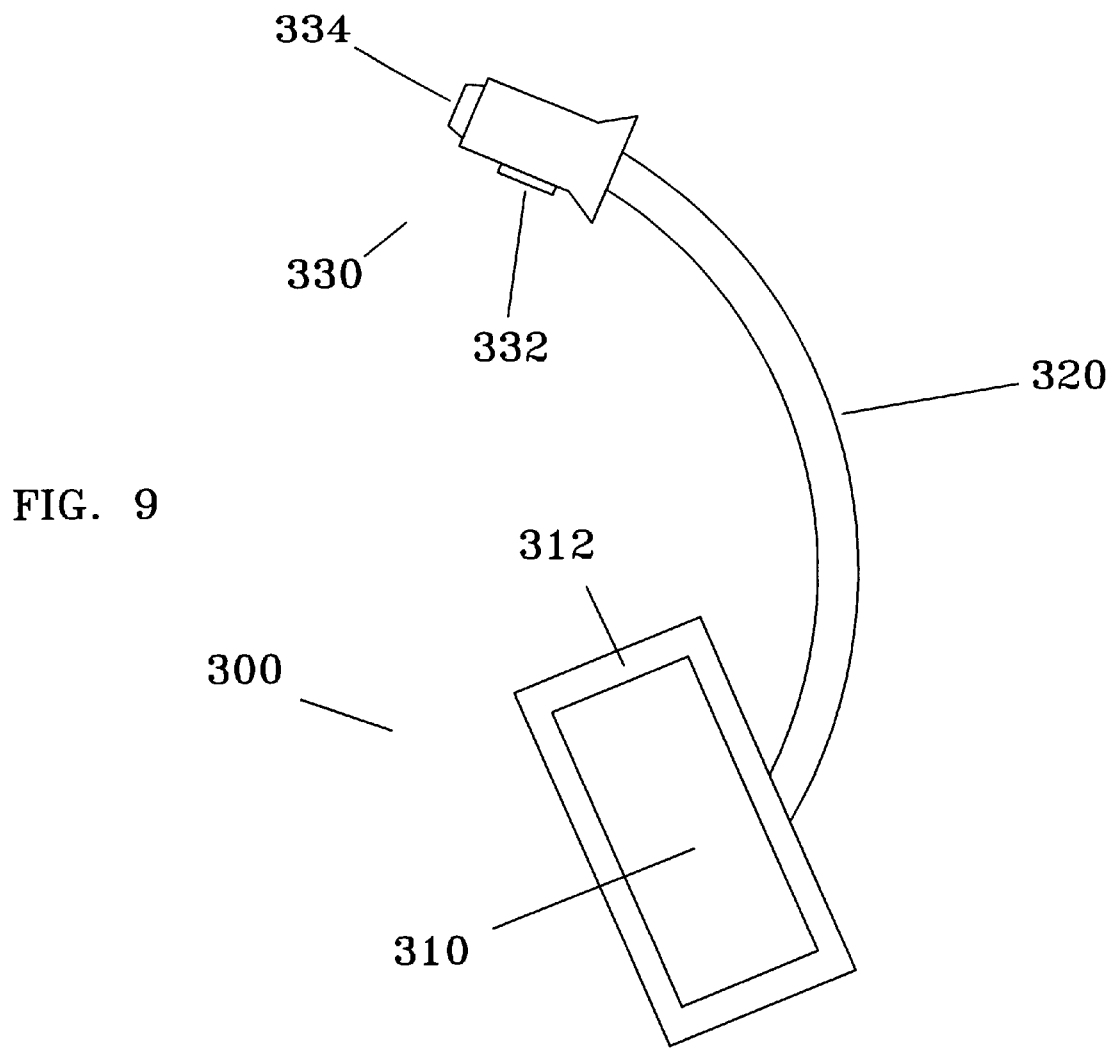

INFANT OBSERVATION MIRROR ATTACHABLE TO AN INFANT CAR SEAT

CROSS-REFERENCES

There are no applications related to this application filed in this or any foreign country.

BACKGROUND

The use of rear-facing infant car seats in the back seat results in the problem of the driver not being able to see the infant during travel. Use of rear-facing seats is frequently considered to be safer and may be legally required. Additionally, installation in the backseat gives the infant greater protection. However, both factors contribute to the driver's inability to actually see the child in the infant car seat.

With forward-facing infant car seats, the driver can see the child in the rearview mirror while driving. However, with a rear-facing seat, all the driver can see is the back of the infant car seat. This can cause the driver to be anxious at times, due to concerns over the welfare of the child. Such concerns could be easily overcome if the driver could see the child, but given the arrangement, this is not possible.

As a result, it is known to use a second, forwardly-facing infant-viewing mirror to see the child. Such mirrors are mounted on the backseat or rear deck of the car, and when used in conjunction with the rearview mirror, allow the driver to see the infant. Such a second mirror is clearly advantageous because it allows the driver to see a reflected image of the infant's face in the rearview mirror. U.S. Pat. Nos. 4,902,118 and 4,909,618 are both examples of mirrors which are mounted on the rear seat or rear deck in a manner that allows light to travel from the infant to the mirror, from which it is reflected forward to the driver's rearview mirror.

A limitation of infant observation mirrors is that they generally must be installed in a rear portion of a car or mini-van by some type of hardware. This may damage the vehicle somewhat, in that the finish may be marred when the infant mirror is removed for vehicle resale.

A related difficulty is that once the infant mirror is installed, it is not easily moved to another location should the infant car seat be needed in a different location or in a different vehicle.

A further limitation of known infant observation mirrors is that the distance of the mirror from the infant is such that the field of view is narrowed considerably. Particularly where the mirror is mounted on the rear deck, underneath the car's rear window, the distance between the mirror and the child's face is such that the field of view is cut dramatically. In fact, the further the infant mirror is from the child's face, the smaller the portion of the mirror which reflects the child's face, and the larger the portion of the mirror with reflects other things.

Similarly, the greater the distance between the driver's rearview mirror and the infant mirror the smaller the infant mirror appears. The further to the rear of the car the mirror is, the smaller the infant mirror would appear in the driver's rearview mirror.

As a result, when the infant mirror is removed from the child's face by too great a distance, and when the infant mirror it too far from the driver's rearview mirror, the driver's view of the child is difficult at best.

For the foregoing reasons, there is a need for an infant observation mirror attachable to an infant car seat that resolves the above limitations. The infant observation mirror should be carried in an adjustably positionable location close to the infant, thereby increasing the percentage of the mirror on which the child's face is actually viewable. The infant mirror should be easily installed and removed without marring the finish of the vehicle. Additionally, the infant mirror should be transportable between vehicles.

SUMMARY

The present invention is directed to an apparatus that satisfies the above needs. A novel infant observation mirror attachable to an infant car seat is disclosed having some or all of the following structures.

(A) A fastening assembly allows attachment of the infant observation mirror to the upper edge of the back of the infant car seat. A preferred fastening assembly provides a C-clamp having a tightening bolt which allows adjustable attachment to infant seat backs of differing thickness.

(B) A curved arm assembly is supported at a first end by the fastening assembly, and supports a mirror assembly at a second end. A preferred curved arm assembly is adjustable, thereby allowing positioning of the mirror assembly in a desired location. A pivot allows the curved arm assembly to be adjusted with respect to the fastening assembly.

(C) A mirror assembly is carried by the second end of the curved arm assembly, and allows the driver of the vehicle to see the face of the baby carried in a rear-facing infant car seat in the car's rearview mirror. A preferred mirror assembly includes a mylar film mirror covering a light-weight base having a soft protective frame.

(D) An adjustment assembly allows rotation about a horizontal and a vertical axis in a manner that allows more accurate positioning of the mirror assembly so that the baby's face may be easily viewed.

(E) A lighting assembly is typically supported within the adjustment assembly, and allows a soft light to be directed to the baby's face, allowing better night viewing by the driver. The lighting assembly typically provides a battery supplying power to a light bulb or diode and a controlling switch.

(F) An auxiliary rearview mirror assembly is easily attached and detached to the car's rearview mirror. The auxiliary rearview mirror assembly allows the driver to view the mirror assembly without the need to adjust the car's rearview mirror.

It is therefore a primary advantage of the present invention to provide a novel infant observation mirror that allows easy attachment and removal to an infant car seat, thereby allowing the observation mirror to be used regularly with a number of car seats or in a number of different vehicles.

Another advantage of the present invention is to provide a novel infant observation mirror attachable to an infant car seat that includes a mirror that is adjustable about a vertical and a horizontal axis.

Another advantage of the present invention is to provide a novel infant observation mirror having an auxiliary mirror assembly attachable to the car's rearview mirror, thereby eliminating the driver's need to use the car's rearview mirror to view the infant observation mirror.

A still further advantage of the present invention is to provide a novel infant observation mirror attachable to an infant car seat that provides a light source which may be used to illuminate the baby's face with soft lighting.

DRAWINGS

These and other features, aspects, and advantages of the present invention will become better understood with regard to the following description, appended claims, and accompanying drawings where:

FIG. 8 is a view similar to that of FIG. 7, showing a second version of the invention attachable to the ceiling of the vehicle.

FIG. 9 is an enlarged view of the auxiliary rearview mirror assembly which is easily attached and removed from the support carrying the car's rearview mirror.

DESCRIPTION

Figure 1:
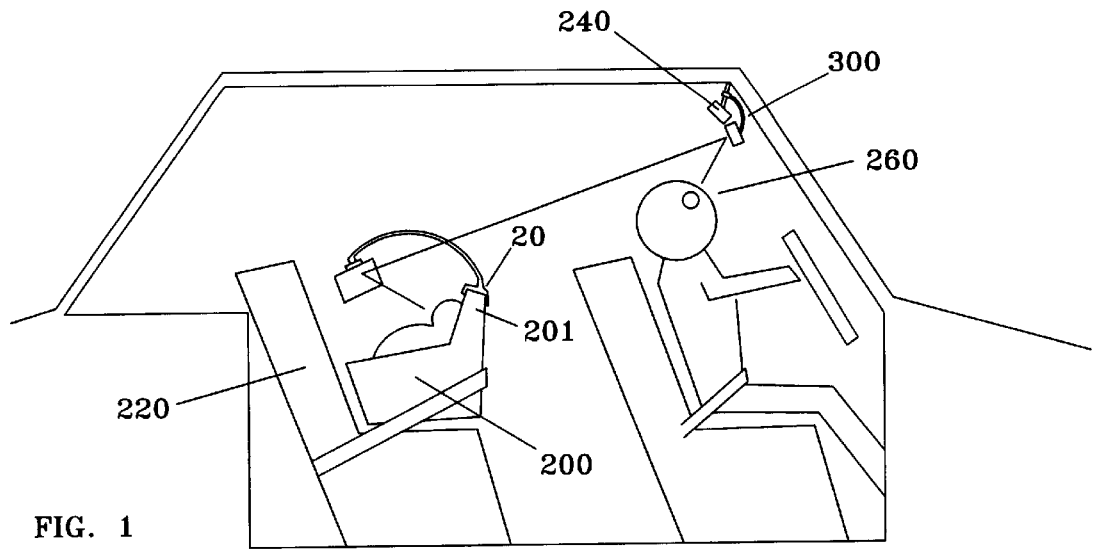
FIG. 1 is a side orthographic view of a version of the infant observation mirror, attached to an infant car seat which is mounted in the rear-facing direction.

Referring in generally to FIGS. 1 through 7, an infant observation mirror 10 attachable to a rear-facing infant car seat 200 constructed in accordance with the principles of the invention is seen. A fastening assembly 20 is releasably attachable to an upper edge of the back of the rear-facing infant car seat. A preferred version of the fastening assembly includes a C-clamp. Alternative versions of the fastening assembly include a modified alligator clamp and a resilient spring clamp. A first end of a curved arm assembly 50 extends from the fastening assembly over the car seat. A preferred curved arm assembly provides a resilient skeleton the shape of which may be adjusted and a soft protective covering. A mirror assembly 60 is supported by the second end of the curved arm assembly, and typically provides a light-weight mylar plastic mirror. An adjustment assembly 70 allows rotation of the mirror about a horizontal and a vertical axis. A lighting assembly 90 provides soft lighting to illuminate the child during night driving. An auxiliary rearview mirror assembly 300 attaches to the support carrying the car's rearview mirror, thereby allowing the driver to view the mirror assembly 60 without moving the car's rearview mirror.

Figure 2:
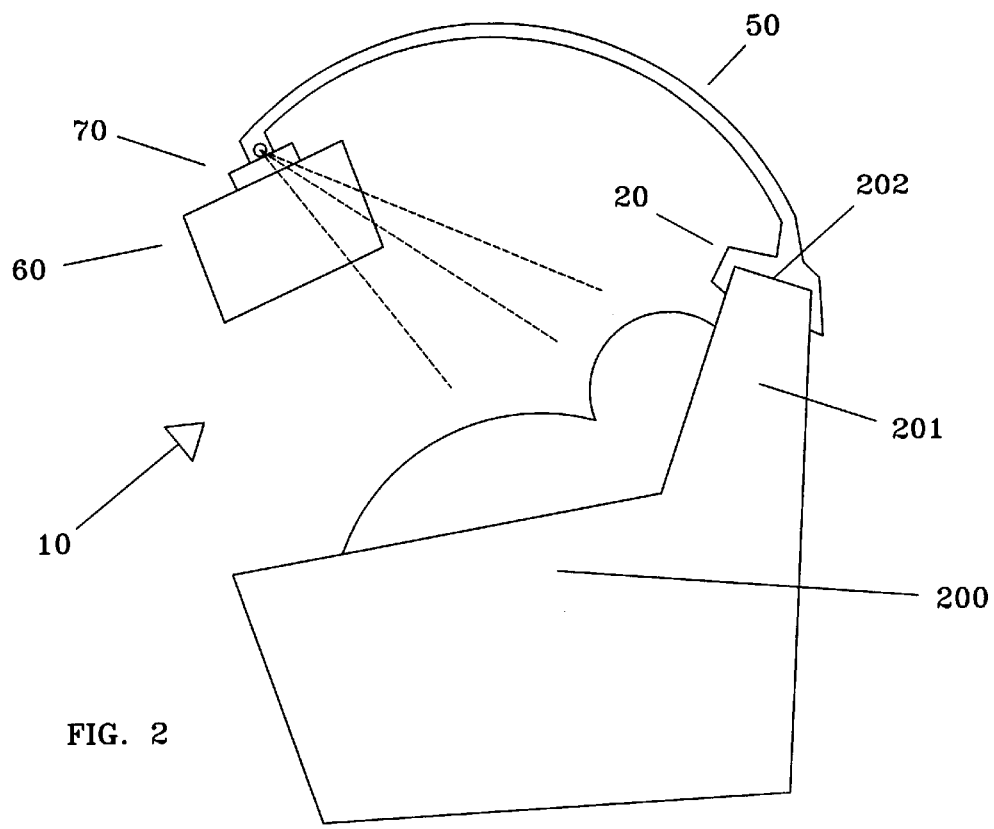
FIG. 2 is an enlarged view of the infant observation mirror of FIG. 1.

Referring to FIGS. 1 and 2 it can be seen that a fastening assembly 20 supports the infant observation mirror 10 on the upper edge 202 of the back 201 of a rear-facing infant car seat 200. By supporting the observation mirror on the infant car seat 200, rather than car's seat 220, the mirror assembly is closer to the child's face, and therefore allows the image of the child's face to be larger when viewed from the driver's rearview mirror 240.

Figure 3:
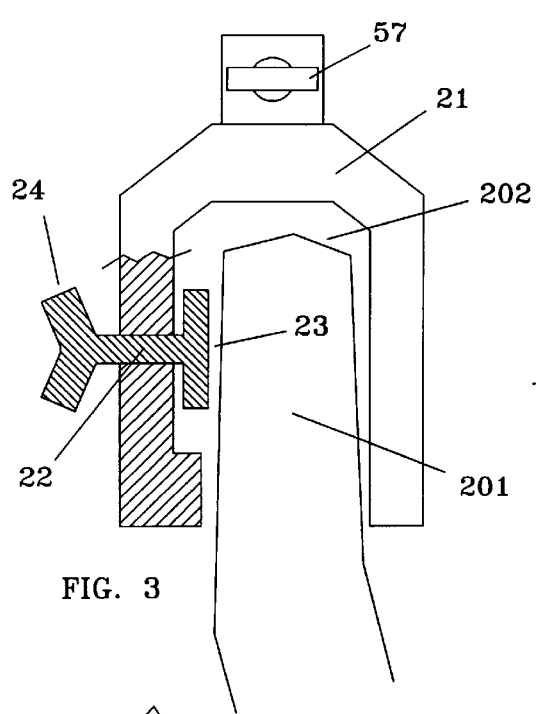
FIG. 3 is a partial cross-sectional side view of a first version of the fastening assembly of the invention, having a C-clamp design.
Figure 4:
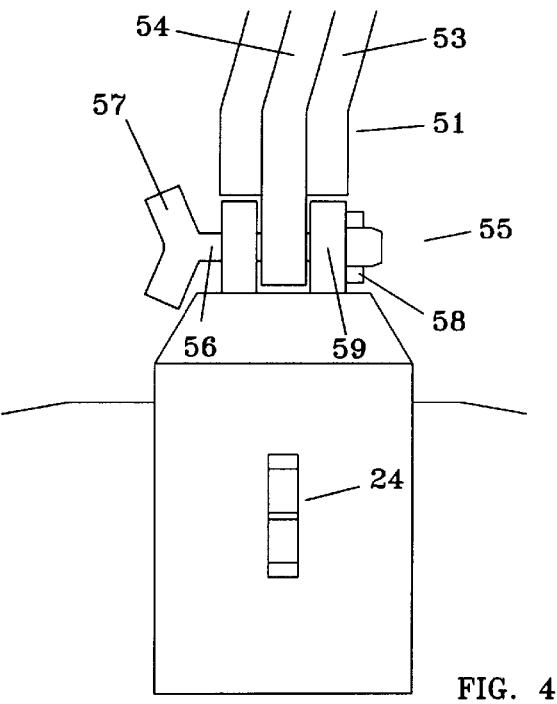
FIG. 4 is a front view if the fastening assembly of FIG. 3.

Referring to FIGS. 3 and 4, a preferred version of the fastening assembly 20 includes a C-clamp 21 sized to fit over the back of the car seat. A threaded tightening bolt 22 is manually operated by a knob or butterfly 24 which moves a pad 23 against the seat back 201 in a manner that is easily understood.

Figure 5:
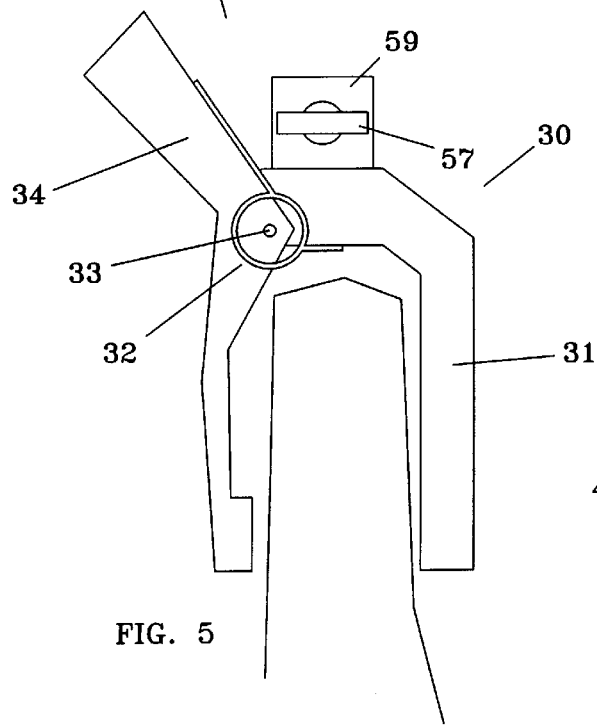
FIG. 5 is a side view of a second version of the fastening assembly of the invention, having a modified alligator clamp design.

As seen in FIG. 5, an alternative fastening assembly 20 includes a modified alligator clamp 30 having a fixed jaw 31 and a movable jaw 34. The movable jaw is biased about a pivot 33 by a spring 32.

Figure 6:
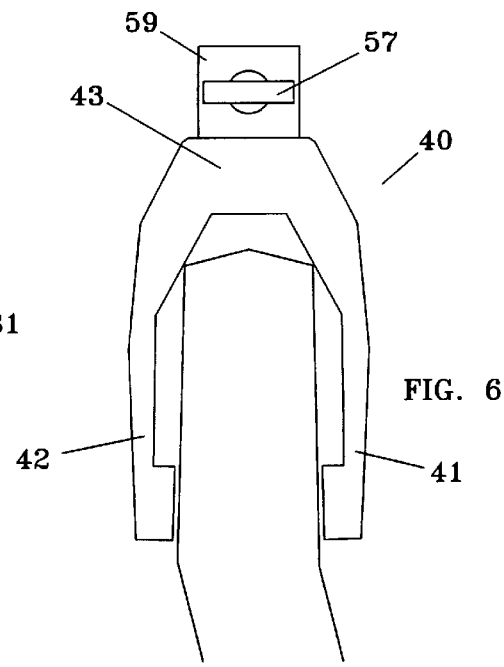
FIG. 6 is a side view of a third version of the fastening assembly of the invention, having a resiliently deformable horseshoe shaped design.

As seen in FIG. 6, a still further example of a fastening assembly includes a resilient clamp 40 having flexible inner and outer forks 41, 42 supported by a base 43. The clamp 40 is sized to allow it to be slipped over the back of most car seats when the forks are flexed apart, and to allow the clamp to firmly grip the back of the car seat when the forks are released.

As seen in FIG. 2, a first end 51 of the curved arm assembly 50 extends from the fastening assembly out over the infant car seat, allowing the mirror assembly to be supported in any desired position. A preferred version of the curved arm assembly includes a resilient skeleton 54 made of flexible metal or plastic. A soft covering 53 may be made of foam rubber or similar material which would protect the baby if contact was made.

In a manner best seen in FIG. 4, an arm support pivot 55 allows for adjustment of the angle of the curved arm assembly with respect to the fastening assembly. As seen in FIG. 4, the resilient skeleton portion of the first end 51 of the curved arm is fastened to two flanges 59 which extend from the fastening assembly 20. A bolt 56 having a manually operable butterfly 57 is threaded into a nut 58 or similar fastener. The angle between the fastening assembly 20 and the first end of the curved arm 50 may be adjusted by loosening the bolt and rotating the arm with respect to the fastening assembly.

Figure 7:
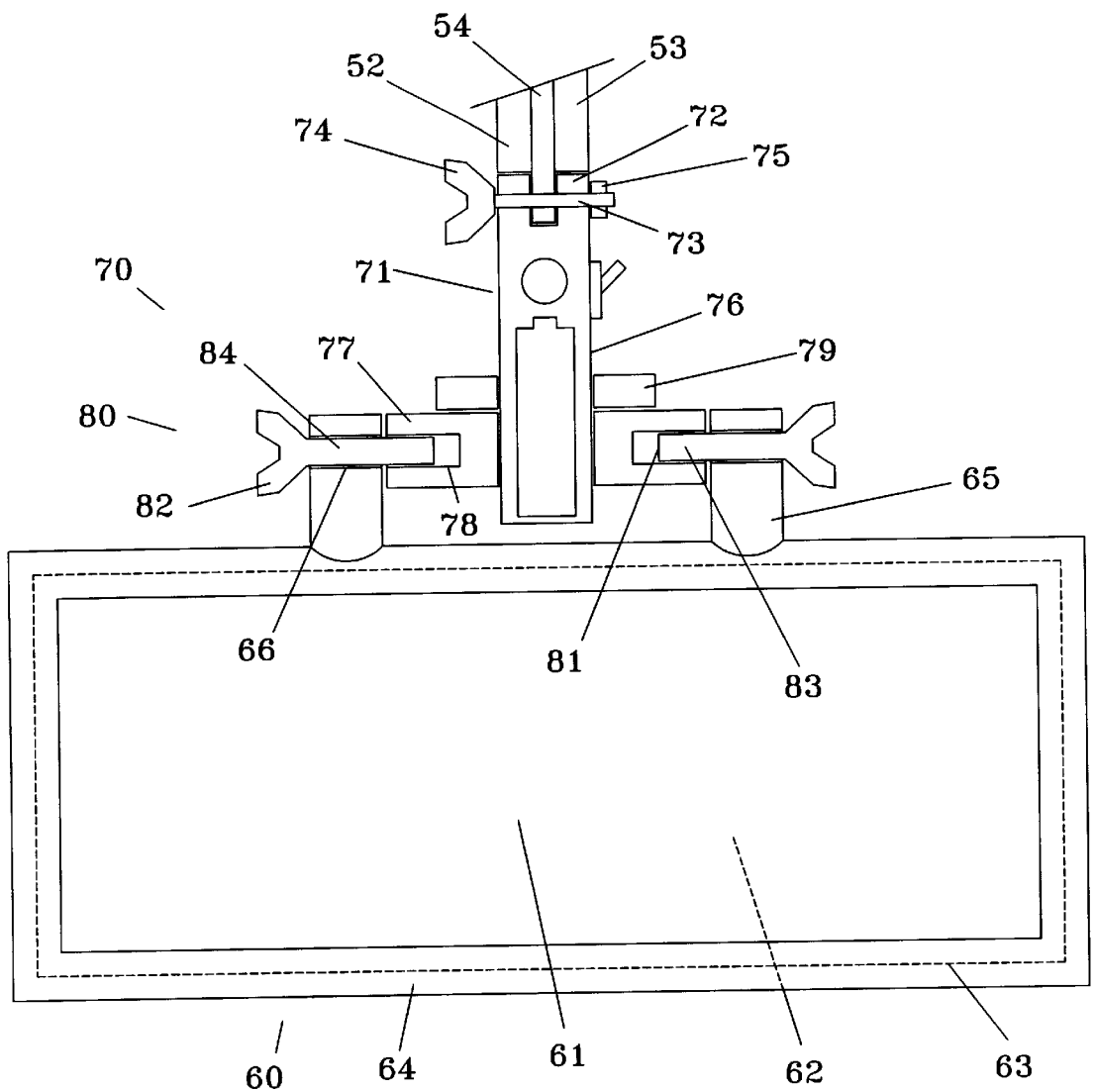
FIG. 7 is an enlarged cross-sectional view of the adjustment assembly and the mirror assembly, illustrating a preferred version of these structures.

As seen in FIG. 7, the second 52 end of the curved arm assembly 50 is attached to the hollow cylindrical body 71 of the adjustment assembly 70. A pair of ears 72, extending from the hollow cylindrical body 71 provide holes sized for passage of a bolt 73 which is easily manually rotated by butterfly 74 into nut 75 or similar fastener.

As seen in FIG. 7, a mirror assembly 60 is carried by the second end 52 of the curved arm assembly 50. The mirror assembly reflects the face of the baby carried in a rear-facing infant car seat, allowing the driver 260 to see the reflection by use of the rearview mirror.

A preferred version of the mirror assembly provides a flat planar base 62 which is typically made of light weight sheet plastic or paperboard. A perimeter 63 of the base is typically edged with a frame 64 which can be made of foam, plastic, rubber or other soft material. The frame tends to soften any contact between the baby and the mirror assembly.

In a preferred version, the generally planar surface of the base is covered with a thin layer of mylar 61 or similar mirrored plastic film. Such a material is of adequate optical quality, without having the weight associated with mirrored surfaces of better quality and higher expense. An important factor in selecting such a mirrored surface is the elimination of the possibility of broken glass or similar sharp fragments of material.

As seen in FIG. 7, an adjustment assembly 70 is carried between the mirror assembly and the curved arm assembly. The adjustment assembly allows the mirror assembly to be pivoted about a substantially vertical and a substantially horizontal axis. As a result of this adjustment, the mirror may be positioned to best reflect the face of the baby carried in the reverse-facing infant car seat in a manner that will allow the reflection to be most easily seen by the driver using the rearview mirror.

A preferred version of the adjustment assembly, carried by the mirror assembly, includes a hollow cylindrical body 71 having a threaded lower portion 76. A vertical pivot nut 77 is internally threaded to mate with the threaded lower portion of the cylindrical body. Rotation of the vertical pivot nut about the threaded lower portion results in rotation of the mirror assembly about a generally vertical axis.

Once the vertical pivot nut is rotated as desired, further rotation can be prevented by moving the locking nut 79 into contact with the vertical pivot nut. Friction between the two prevents further rotation by either until the friction is overcome, thereby releasing both.

The vertical pivot nut defines a pair of opposed threaded holes 78 sized to support the horizontal pivot 80. The opposed threaded holes are perpendicular to the hollow cylindrical body and allow rotation of the mirror assembly about a generally horizontal axis.

As seen in FIG. 7, a preferred version of the horizontal pivot 80 includes opposed bolts 81, having a threaded portion 83 sized to thread by manual rotation of butterflies 82 into the opposed threaded holes 78 defined in the vertical pivot nut 77. A non-threaded portion 84 of the bolts passes through holes 66 defined in the ears 65 of the mirror assembly 60. Rotation of the mirror assembly prior to tightening the bolts 81 allows the mirror assembly to be adjusted about the horizontal axis.

In a preferred version of the invention, a lighting assembly 90 is carried within the hollow cylindrical body 71. The lighting assembly provides a soft light which may be directed at the child's face and upper body, thereby enhancing the reflected image seen by the driver in the mirror assembly.

As seen in FIG. 7, the lighting assembly provides a light bulb 91 powered by a battery 93. The bulb may be a of conventional incandescent style or may be a low-power diode designed for maximizing battery life. A switch 92 allows the user to turn the light on and off. Replacement of the bulb, battery or a damaged switch is easily done by removing the hollow cylindrical body 71 from the second end 52 of the curved arm assembly by removal of the bolt 73.

As seen in FIGS. 1 and 9, an auxiliary rearview mirror assembly 300 provides the driver with a clear view of the mirror assembly 60, and therefore a clear view of the baby in the infant car seat. The auxiliary rearview mirror assembly is therefore located in the line of sight of the mirror assembly 60. The auxiliary mirror assembly allows the driver to maintain the position of the car's rearview mirror on the road, and to maintain the position of the auxiliary mirror on the mirror assembly. As a result, constant readjustment is not required on either assembly.

A preferred auxiliary rearview mirror assembly includes a mirror 310 carried in a frame 312. The mirror may be of an optically clear glass or lightweight plastic film type. The frame may be made of a soft material to prevent injury in a car wreck.

A first end of a support arm 320 supports the frame and mirror in the desired location, typically adjacent to the car's rearview mirror. A preferred support arm may be made of somewhat deformable material, such as plastic or foam coated metal, so that the mirror may be positioned to suit the driver.

A second end of the support arm carries a fastener 330 which is suitable for attachment to the arm supporting the car's rearview mirror, or to the rearview mirror itself or to an adjacent surface such as the windshield. A preferred version of the fastener 330 includes an alligator type jaw 334 and coiled spring 332; however a number of other fastener types are well-known and could be substituted. For example, where the auxiliary mirror assembly is to be attached to the car's windshield, a suction cup may be used.

As seen in FIG. 8, an alternative version of the invention is supported by the car's ceiling in an area immediately above the infant car seat. In a preferred version, a roof support assembly 100 includes a covering of female VEL-CRO® 102 attached to the ceiling by an adhesive layer 101. A layer of male VELCRO® 103 is sized to attach to the female VELCRO®. Extending from the male VELCRO® is an arm 104 protected by a soft covering 105. The arm is attached to the mirror assembly 60 by bolt 73 in a manner similar to that seen above.

To use the infant observation mirror 10, the user attaches the fastening assembly 20 to the upper edge 202 of the back 201 of the infant car seat 200. Where a C-clamp 21 is used, the knob 24 is operated, tightening the pad 23 against the back 201. Where an alligator clamp is used, the jaw is opened against the bias of the spring and allowed to close on the back of the car seat.

The adjustment assembly is then use to position the mirror assembly in a location where the child's face is best reflected in the mirror. The mirror may first be adjusted about a generally vertical axis. The locking nut 79 is retracted somewhat from the vertical pivot nut, allowing rotation. Once rotated properly, the vertical pivot nut is again fixed by use of the locking nut. The mirror may then be adjusted about a generally horizontal axis. The bolts 81 may be loosened, the mirror adjusted, and the bolts re-tightened. Once properly adjusted, the driver 260 is then able to see the image of the baby's face in the mirror assembly by looking into the car's rearview mirror or in the auxiliary rearview mirror assembly.

In a preferred application, the auxiliary rearview mirror assembly 300 is attached to the arm supporting the car's rearview mirror 240 by fastener 330. The somewhat deformable support arm 320 is bent slightly, so that the mirror 310 is positioned so that the baby's face can be seen in the mirror assembly.

The previously described versions of the present invention have many advantages, including a primary advantage of providing a novel infant observation mirror that allows easy attachment and removal to an infant car seat, thereby allowing the observation mirror to be used regularly with a number of car seats or in a number of different vehicles.

Another advantage of the present invention is to provide a novel infant observation mirror attachable to an infant car seat that includes a mirror that is adjustable about a vertical and a horizontal axis.

A still further advantage of the present invention is to provide a novel infant observation mirror attachable to an infant car seat that provides a light source which may be used to illuminate the baby's face with soft lighting.

The invention resides not in any one of these features per se, but rather in the particular combination of all of them herein disclosed and claimed and it is distinguished from the prior art in this particular combination of all of its structures for the functions specified.

Although the present invention has been described in considerable detail and with reference to certain preferred versions, other versions are possible. For example, while several preferred versions of the fastening assembly have been disclosed, alternate variations of the same or similar element could result in generally equivalent structures. Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An infant observation mirror attachable to an infant car seat, the infant observation mirror comprising:
   (A) fastening assembly means for attachment to an upper edge of the back of the infant car seat;
   (B) a curved arm assembly supported at a first end by the fastening assembly means, comprising:
      (a) a resilient skeleton; and
      (b) a soft covering carried by the resilient skeleton;
   (C) mirror assembly means, carried by a second end of the curved arm assembly, for reflecting the face of a baby carried in a rear-facing infant car seat;
   (D) adjustment assembly means, carried by the mirror assembly means, for allowing rotation about a horizontal axis and a vertical axis, thereby allowing accurate positioning of the mirror assembly means; and
   (E) lighting assembly means, supported within the adjustment assembly means, for producing a soft light.

2. An infant observation mirror attachable to an infant car seat, the infant observation mirror comprising:
   (A) fastening assembly means for attachment to an upper edge of the back of the infant car seat;
   (B) a curved arm assembly supported at a first end by the fastening assembly means;
   (C) mirror assembly means, carried by a second end of the curved arm assembly, for reflecting the face of a baby carried in a rear-facing infant car seat;
   (D) adjustment assembly means, carried by the mirror assembly means, for allowing rotation about a horizontal axis and a vertical axis, thereby allowing accurate positioning of the mirror assembly means, the adjustment assembly means comprising:
      (a) a hollow cylindrical body having a threaded lower portion;
      (b) a vertical pivot nut, carried by the threaded lower portion, the vertical pivot nut defining opposed threaded holes;
      (c) a locking nut, carried by the threaded lower portion adjacent to the vertical pivot nut; and
      (d) horizontal pivot assembly means, carried by the opposed threaded holes defined in the vertical pivot nut, for rotating the mirror assembly means about a generally horizontal axis, comprising opposed horizontal bolts carried by the opposed threaded holes defined in the vertical pivot nut and
   (E) lighting assembly means, supported within the adjustment assembly means, for producing a soft light.

3. An infant observation mirror attachable to an infant car seat, the infant observation mirror comprising:
   (A) fastening assembly means for attachment to an upper edge of the back of the infant car seat having arm support pivot means, carried by the fastening assembly means, for adjusting the angle of a curved arm assembly with respect to the fastening assembly means;
   (B) said curved arm assembly supported at a first end by the fastening assembly means, comprising:
      (a) a resilient skeleton; and
      (b) a soft covering carried by the resilient skeleton
   (C) mirror assembly means, carried by a second end of the curved arm assembly, for reflecting the face of a baby carried in a rear-facing infant car seat;
   (D) adjustment assembly means, carried by the mirror assembly means, for allowing rotation about a horizontal axis and a vertical axis, thereby allowing accurate positioning of the mirror assembly means;
   (E) lighting assembly means, supported within the adjustment assembly means, for producing a soft light; and
   (F) auxiliary mirror assembly means, carried in the line of sight of the mirror assembly means, for allowing observation of the mirror assembly means.

4. The infant observation mirror attachable to an infant car seat of claim 3, in which the fastening assembly means comprises a C-clamp.

5. The infant observation mirror attachable to an infant car seat of claim 3, in which the fastening assembly means comprises an alligator clamp.

6. The infant observation mirror attachable to an infant car seat of claim 3, in which the fastening assembly means comprises a resilient spring clamp.

7. The infant observation mirror attachable to an infant car seat of claim 6, in which the mirror assembly means comprises:
   (a) a light weight base;
   (b) a soft protective frame carried by a perimeter portion of the base; and
   (c) a film mirror covering a generally planar surface of the light weight base.

8. The infant observation mirror attachable to an infant car seat of claim 7, in which the adjustment assembly means comprises:
   (a) a hollow cylindrical body having a threaded lower portion;
   (b) a vertical pivot nut, carried by the threaded lower portion, the vertical pivot nut defining opposed threaded holes;
   (c) a locking nut, carried by the threaded lower portion adjacent to the vertical pivot nut; and
   (d) horizontal pivot assembly means, carried by the opposed threaded holes defined in the vertical pivot nut, for rotating the mirror assembly means about a generally horizontal axis, comprising opposed horizontal bolts carried by the opposed threaded holes defined in the vertical pivot nut.

9. An infant observation mirror attachable to an infant car seat, the infant observation mirror comprising:
   (A) fastening assembly means for attachment to an upper edge of the back of the infant car seat, the fastening assembly means comprising a C-clamp;
   (B) a curved arm assembly supported at a first end by the fastening assembly means, the curved arm assembly comprising:
      (a) a resilient skeleton; and
      (b) a soft covering carried by the resilient skeleton;
   (C) arm support pivot means, carried by the fastening assembly means, for adjusting the angle of the curved arm assembly with respect to the fastening assembly means;
   (D) mirror assembly means, carried by a second end of the curved arm assembly, for reflecting the face of a baby carried in a rear-facing infant car seat, the mirror assembly means comprising:
      (a) a light weight base;
      (b) a soft protective frame carried by a perimeter portion of the base; and (c) mirrored plastic film covering a generally planar surface of the light weight base;

(E) adjustment assembly means, carried by the mirror assembly means, for allowing rotation about a horizontal axis and a vertical axis, thereby allowing accurate positioning of the mirror assembly means, the adjustment assembly means comprising:
   (a) a hollow cylindrical body having a threaded lower portion;
   (b) a vertical pivot nut, carried by the threaded lower portion, the vertical pivot nut defining opposed threaded holes;
   (c) a locking nut, carried by the threaded lower portion adjacent to the vertical pivot nut; and
   (d) horizontal pivot assembly means, carried by the opposed threaded holes defined in the vertical pivot nut, for rotating the mirror assembly means about a generally horizontal axis, comprising opposed horizontal bolts carried by the opposed threaded holes defined in the vertical pivot nut; and (F) lighting assembly means, supported within the adjustment assembly means, for producing a soft light; and (G) auxiliary mirror assembly means, carried in the line of sight of the mirror assembly means, for allowing observation of the mirror assembly means, the auxiliary mirror assembly means comprising:
   (a) a fastener;
   (b) a support arm having a first end attached to the fastener; and
   (c) a mirror, carried by a second end of the support arm.

* * * * *